US011190530B2

(12) United States Patent
Nogin et al.

(10) Patent No.: US 11,190,530 B2
(45) Date of Patent: Nov. 30, 2021

(54) METHOD AND SYSTEM FOR DETECTING ATTACKS ON MONITORED PHYSICAL SYSTEMS

(71) Applicant: APERIO SYSTEMS (2020) LTD., Ceasaria (IL)

(72) Inventors: Yevgeni Nogin, Tirat Carmel (IL); Itay Baruchi, Tel Aviv (IL); Charles Tresser, Tel Aviv (IL)

(73) Assignee: APERIO SYSTEMS (2020) LTD., Ceasaria (IL)

( * ) Notice: Subject to any disclaimer, the term of this patent is extended or adjusted under 35 U.S.C. 154(b) by 303 days.

(21) Appl. No.: 16/334,788

(22) PCT Filed: Sep. 19, 2017

(86) PCT No.: PCT/IL2017/051061
§ 371 (c)(1),
(2) Date: Mar. 20, 2019

(87) PCT Pub. No.: WO2018/055616
PCT Pub. Date: Mar. 29, 2018

(65) Prior Publication Data
US 2020/0186549 A1 Jun. 11, 2020

Related U.S. Application Data

(60) Provisional application No. 62/397,362, filed on Sep. 21, 2016.

(51) Int. Cl.
*H04L 29/06* (2006.01)
*G05B 23/02* (2006.01)

(52) U.S. Cl.
CPC ...... *H04L 63/1416* (2013.01); *G05B 23/0221* (2013.01); *H04L 63/1433* (2013.01)

(58) Field of Classification Search
CPC ............ H04L 63/1416; H04L 63/1433; G05B 23/0221
See application file for complete search history.

(56) References Cited

U.S. PATENT DOCUMENTS 7,313,092 B2 * 12/2007 Lau ........................... H04L 1/20
370/230
7,665,135 B1 * 2/2010 Mohiuddin ......... H04L 63/0218
726/22

(Continued)

FOREIGN PATENT DOCUMENTS

WO    WO 03/091911    11/2003

OTHER PUBLICATIONS

Mpitziopoulous et al., "A survey on jamming attacks and countermeasures in WSNs", IEEE Communications Surveys and Tutorials, Instituteof Electrical and Electronics Engineers, US, vol. 11, No. 4, Oct. 1, 2009, pp. 42-56.

(Continued)

*Primary Examiner* — Sarah Su
(74) *Attorney, Agent, or Firm* — Pearl Cohen Zedek Latzer Baratz LLP (57) ABSTRACT

A computer system and computer implemented method of detecting attacks on physical systems are disclosed. The system may include one or more databases and one or more controller configured to execute instructions. The instructions may include the following method steps: receiving at least one signal related to a monitored physical system; de-noising the at least one signal to extract a smooth portion of the signal; detecting one or more states of the monitored physical system by analyzing the smooth portion of the signal; obtaining a noise portion of the signal by subtracting the de-noised smooth portion from the at least one signal; classifying the noise portion; determining expected states of the system based on the classified noise portion; comparing (Continued)

the expected states to the detected one or more states; and detecting an attack on the monitored physical system based on the comparison.

15 Claims, 6 Drawing Sheets

(56) References Cited

U.S. PATENT DOCUMENTS

| | | | |
|---|---|---|---|
| 7,808,916 B1 | 10/2010 | Futamura et al. | |
| 9,043,894 B1* | 5/2015 | Dennison | H04L 63/1408 |
| | | | 726/11 |
| 9,906,544 B1* | 2/2018 | Kurupati | H04L 63/1425 |
| 10,805,326 B1* | 10/2020 | Wang | H04L 63/1416 |
| 2004/0059947 A1* | 3/2004 | Lee | H04L 63/1466 |
| | | | 726/23 |
| 2004/0062199 A1 | 4/2004 | Lau et al. | |
| 2016/0173509 A1* | 6/2016 | Ray | H04L 63/1425 |
| | | | 726/23 |
| 2016/0315961 A1* | 10/2016 | Duer | H04L 63/1433 |
| 2017/0118245 A1* | 4/2017 | Tcherchian | H04L 63/1416 |
| 2017/0149812 A1* | 5/2017 | Alton | G06N 7/005 |
| 2017/0310694 A1* | 10/2017 | Kamiya | G06F 21/56 |
| 2020/0145416 A1* | 5/2020 | Mitzimberg | H04L 63/083 |

OTHER PUBLICATIONS

International Search Report of PCT Application No. PCT/IL2017/051061 dated Dec. 1, 2017.

* cited by examiner

METHOD AND SYSTEM FOR DETECTING ATTACKS ON MONITORED PHYSICAL SYSTEMS

CROSS-REFERENCE TO RELATED APPLICATIONS

This application is a National Phase Application of PCI International Application No. PCT/IL 2017/051061, International Filing Date Sep. 19, 2017, claiming the benefit of U.S. Provisional Patent Application No. 62/397,362, tiled Sep. 21, 2016, all of which are hereby incorporated by reference.

BACKGROUND OF THE INVENTION

The present invention is about detection of forgery in data coming from monitored physical systems, such as: industrial control systems in power plants and manufacturing plants, the flight instruments of an aircraft or a ship, the flight control system of a remote-controlled missile, medical monitoring devices used during surgery in hospitals. The data coming from those systems has critical importance for real time emergency decision making, and thus the assurance of its authenticity is of paramount importance.

Together with other monitored physical systems, industrial control systems—such as the systems installed in many manufacturing plants, power plants and electricity distribution systems are sensitive to malicious attacks. These systems include means for detecting operational problems and malfunctions in the various components controlled by the control system. However, these systems are not immune against attacks on the control systems themselves. The state of a physical system is controlled using various sensors for sensing the condition of the various components included in the system. Such sensors include direct measurement of voltage, current, power etc. and indirect measurements such as temperature vibration, sound etc.

Figure 1:
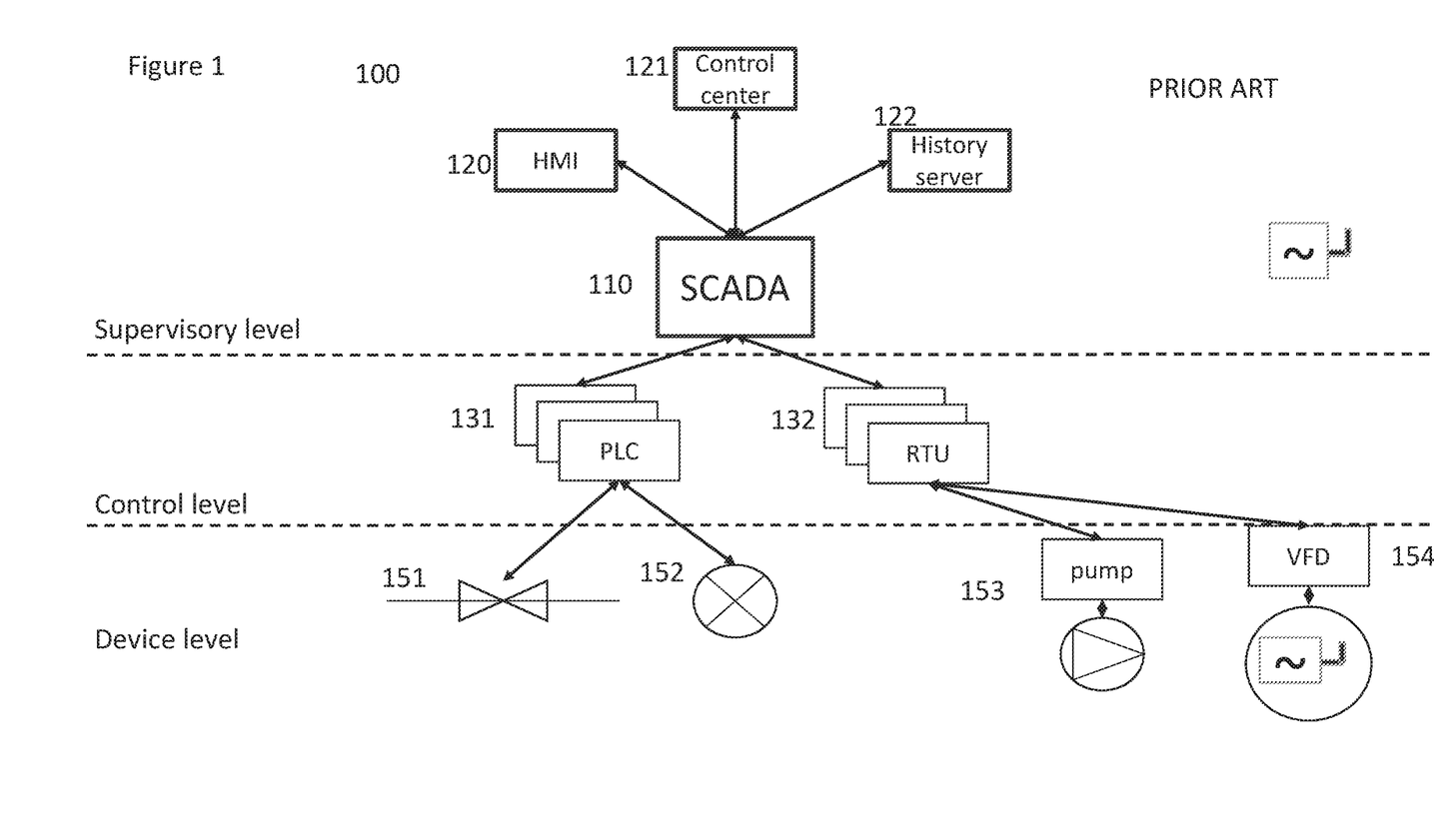
FIG. 1 is a high level block diagram of an industrial control system as known in the art.

FIG. 1 is a high level block diagram of an industrial control system as known in the art. An industrial control system 100 may include a 3 levels structure. A first device level, that may include the various components and physical devices such as pumps 153, variable-frequency drives (VFDs) 154, sensors 152, valves 151, and other components such as motors, turbines, compressors and the like. A second control level may include programmable logical controllers (PLC) 131 and/or remote terminal units (RTU) 132 for controlling the physical devices of the first device level. A third supervisory level may supervise the controllers of the control level and may include a supervisory control and data acquisition (SCADA) 110. SCADA 110 may have several interfaces that most often comprise human-machine interfaces (HMI) either as standalone HMI's 120 and/or through a control center at 121. The data collected by the SCADA system is typically stored in a database known as the historian database.

Malicious attacks on a monitored physical system may include: stopping production processes, generate damage to the system and the like. Attackers may penetrate such systems and control them in a variety of ways, for example, taking control of the SCADA, changing the set points of the system (or a component of the system) in a way which will damage or stop their activity while optionally, overriding or canceling the alarms and protection logic in the SCADA.

There are several known attacks: Injection attack—whereby the attacker changes the set point of the system while transmitting synthetic signals of standard operation state to the HMI; Transform attack—whereby the attacker applies a transform such as multiplication by a constant on the set points of the system and a reverse transform on the monitoring control signals. The attack can take form as any type of function including simple functions such as multiplication and division, and complex functions that will generate a smooth transition. One example of a function is a linear function $f'(t)=a(t)*f(t)$ where $a(t)$ can be a constant factor or a factor slowly changing in time to conceal the transition stage; 2nd order transform attack—the attacker de-noises the signal, then applies a transform such as multiplication, and adds a noise with the same set of characteristic parameters as should be expected for a signal at the post-transform level; and Replay attack—the attacker records the control signals of the system while in standard operation state and replays them to the HMI while changing the system set points.

Detecting and preventing such attacks are highly required for defending systems, and in particular critical systems (e.g., power plants) from harmful attacks.

SUMMARY OF THE INVENTION

Some aspects of the invention may be directed to a computer system and computer method of detecting attacks on physical systems. The system may include one or more databases and one or more controller configured to execute instructions. The instructions may include the following method steps: receiving at least one signal related to a monitored physical system; de-noising the at least one signal to extract a smooth portion of the signal; detecting one or more states of the monitored physical system by analyzing the smooth portion of the signal; obtaining a noise portion of the signal by subtracting the de-noised smooth portion from the at least one signal; classifying the noise portion; determining one or more expected states of the system based on the classified noise portion; comparing the one or more expected states to the detected one or more states; and detecting an attack on the monitored physical system based on the comparison.

In some embodiments, classifying the noise portion may include comparing the noise portion to classified fingerprints of noise portions stored in a database. In some embodiments, the method may further include dividing the noise portion into discrete segments and therefore, classifying the noise portion may include classifying at least some of the discrete segments. In some embodiments, classifying the noise portion may include obtaining noise signal features from the discrete segments.

In some embodiments, the at least one signal related to a monitored physical system comprises at least one of: temperature, current, voltage, pressure, vibrations, strains, power, phase, and loads.

In some embodiments, the method may further include receiving a signal associated with a known state of the system; de-noising the received signal to extract a smooth portion of the signal and obtaining the noise portion of the signal; associating each one of the smooth portion of the signal and the noise portion of the signal with the known state of the system and saving the noise portion of the signal associated the known state of the system in the database. In some embodiments, the method may further include saving the smooth portion of the signal associated the known state of the system in a database and/or generating a classification module based on the associated smooth and noise portions.

In some embodiments, the method may include updating the classification module with new associated smooth and noise portions.

In some embodiments, the method may include receiving a set of signals related to a monitored physical system; identifying some of the signals in the set as authenticated signals; identifying at least one of the signals in the set to be un-authenticated signal; generating a first estimated signal for each of the at least one of the un-authenticated signal based on the identified authenticated signals; comparing the first estimated signal and the at least one un-authenticated signal; and detecting an attack on the monitored physical system based on the comparison. In some embodiments, the set of signals may include two or more signals related to two or more different parameters of the monitored physical system.

In some embodiments, generating an estimated signal may include generating a specific vector based on a regression model for each of the at least one of the un-authenticated signal based on the identified authenticated signals.

In some embodiments, the method may further include identifying at least one signal from the set of signals as a potentially fake signal based on the compression between the first estimated signal and the at least one un-authenticated signal; receiving one or more external signals from one or more sensors external to the monitored system; generating a second estimated signal for each of the at least one potentially fake signal based on the one or more external signals; comparing the second estimated signal and the at least one potentially fake signal; and detecting an attack on the monitored physical system based on the comparison.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

Some embodiments of the invention may be directed to an independent system for detecting attacks on monitored physical systems. Such an independent system may not be directly connected or controlled by the controller or the SCADA of the monitored physical system, therefore may be immune to external attacks. Such a system may include an independent control system located externally and optionally remotely from the monitored physical system that may receive signals directly from the physical devices (components) of the monitored physical system and may detect based on the received signal, a deviation or change in a typical signal that may indicate that an attack was made on the system.

A method according to some embodiments of the invention may include detecting fake signals or deviated signal by identifying a fingerprint associated with various signals received from measurement of parameters of the physical devices. For example, fingerprints which are due to electro-mechanical machine noise—for example the electro-magnetic noise generated by an electric motor or generator, mechanical vibrations of a spinning turbine, detectors and sensor's measurement noise, transmission line noise, temperatures fluctuations, specific sounds a system generates—for example each pump can have a specific sound pitch, fluctuation in pressures measurements—for example, in cooling liquid circulation systems, and the like. A fingerprint according to embodiments of the invention may include any measurable parametric behavior of the monitored physical system which is embedded in the signals it is generating either directly (for example current) or indirectly (for example sound, which may not be an intended measured parameter of the monitored physical system, but allows deducing other parametric quantities). The fingerprint may be specific and unique for each system. Optionally, the fingerprint should also be correlated to the state of the system. For example, an electrical motor may have a unique sound pitch which changes with the motor rotation speed. The change of the pitch as function of motor rotating speed may also be unique and may also be used for fingerprinting. A monitored physical system may have several signals measured in parallel—a fingerprint can be generated by the combination of unique features of each signal.

The fingerprints identification may be the basis for signal authentication methods according to embodiments of the invention. These methods may be based on a hierarchy of analysis methods that help one to reduce as much as possible the number of false positive alarms and to reduce the possibility of faking the overall system.

Methods according to embodiments of the invention may include building a fingerprints database for a specific monitored physical system. The database may include fingerprints related to more than one monitored physical system. The database may supply to the system historical (e.g., typical) fingerprints of the system to be compared to a real-time measurements.

Figure 2:
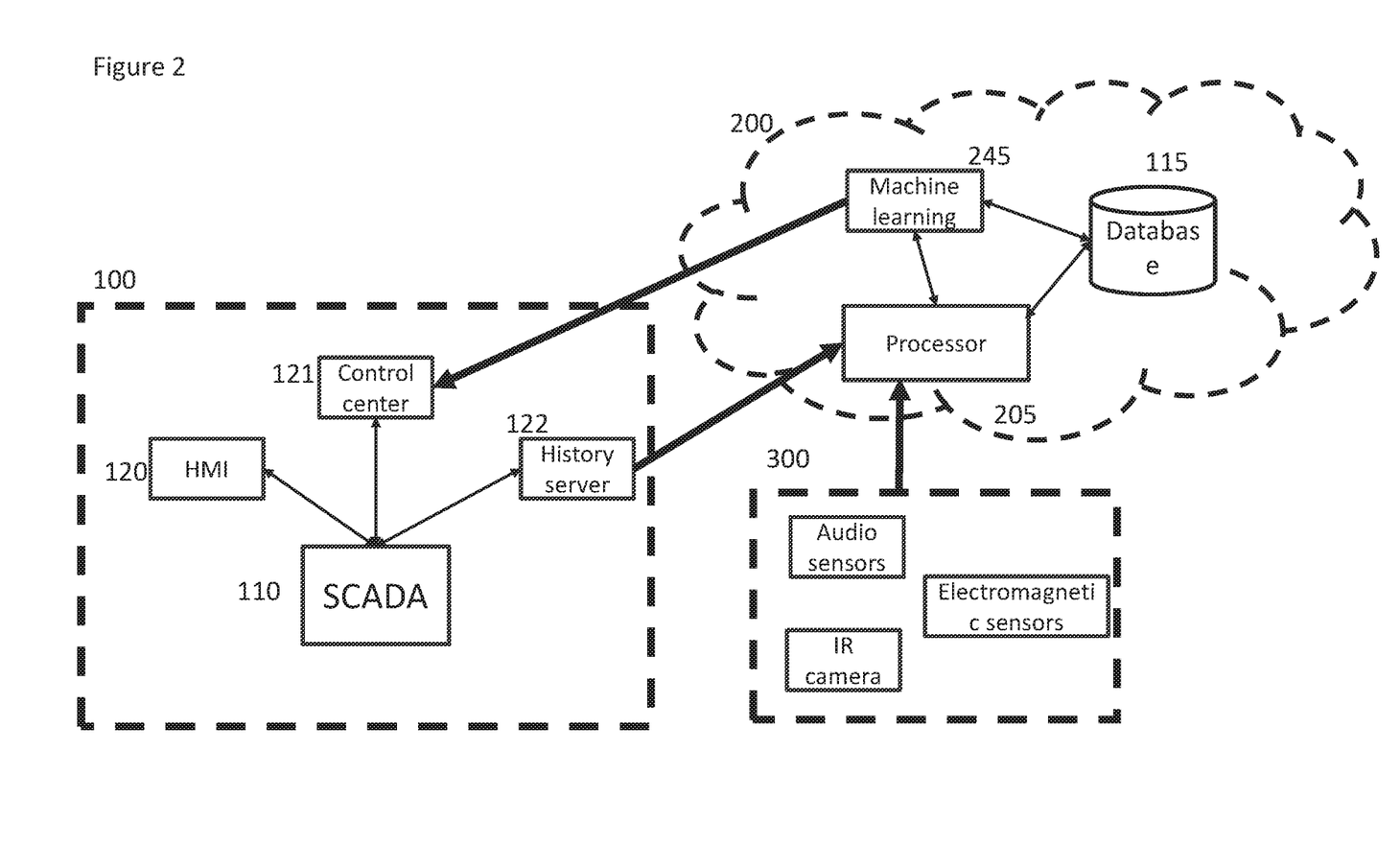
FIG. 2 is a high level block diagram of a system for detecting attacks on monitored physical systems according to embodiments of the invention.

Reference is made to FIG. 2 a high level block diagram of a system for detecting attacks on monitored physical systems according to embodiments of the invention. A system 200 may include a processor 205 and one or more databases 115. System 200 may include a machine learning module 245. System 200 may be in communication with control system 100, for FIG. 1, however may be completely independent from control system 100. System 200 may receive signals and information from control system 100, but cannot be affected, changed, amended, decoded and/or receive instructions from control system 100. System 200 may further receive information and signals from detection system 300 located and/or included in the physical devices of the monitored physical system.

Processor 205 may include a central processing unit (CPU), a chip or any suitable computing or computational device. Processor 205 may include an operating system and a memory for storing thereon instructions and code for executing methods according to some embodiments of the invention. Processor 205 may perform analysis of signal received from detection system 300, for example, by using authentication algorithm and performs required classification and regression analysis. The authentication algorithm and regression analysis may be performed in module 245 using fingerprints and regression models stored in databases 122 (history server) and 115. In some embodiments, module 245 may be included in processor 205. System 200 may be remotely located with respect to the monitored physical system and may receive the signals from system 100 or system 300 by wired or wireless communication. Methods for building fingerprints databased are disclosed with respect to FIGS. 4 and 6.

In some embodiments, in case of a detection of an attack (e.g., a detection of a fake signal) a notification may be send to control system 100 and/or to a list of users that should to be informed.

In some embodiments, system 200 may receive signals directly measured from monitored devices, additional sensors either internal or external to the monitored physical system that may be used by the authentication system. Detection system 300 may increase the strength of the signal authentication and decrees the number of false alarms. System 300 may include audio and vibration sensors, IR cameras, a variety of electromagnetic sensors and other types of short and long range detectors. The signal from system 300 may be integrated in the authentication process as part of a multi-signal authentication algorithm.

Figure 3:
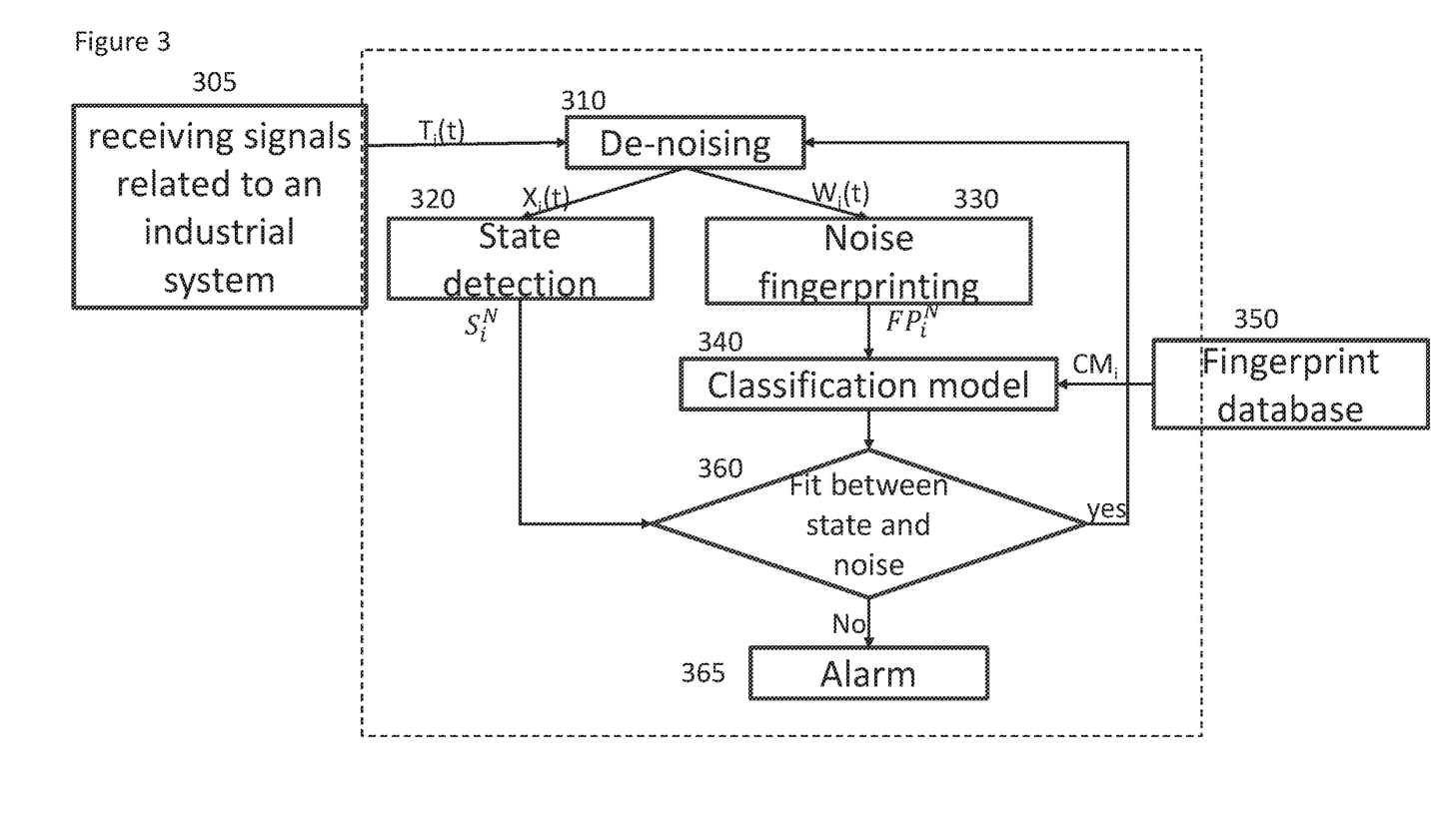
FIG. 3 is a flowchart of a method of detecting attacks on monitored physical systems according to embodiments of the present invention.

Reference is made to FIG. 3 which is a flowchart of a method of detecting attacks on monitored physical systems according to some embodiments of the present invention. Embodiments of the method may be performed by a system such as system 200 or may any other suitable computation system. Embodiments of the invention may include receiving at least one signal related to a monitored physical system, for example, from SCADA 110 or from history database 122, in operation 305. A signal $T_i$ may be acquired by measurements of a physical state of the device (e.g., its temperature, current, voltage, pressure, vibrations, strains, loads, power, phases, and the like). The signal may be sampled every $\tau$ units of time, such that $n\tau$ represents the time of sampling point #n. In some embodiments, "t" is used instead of $n\tau$. Some of the main sources of noise in such a system are typically sampling noise added to the signal by the analog transmission line and analog to digital (AD) converter and activity noise of the device itself. The signal may include two components:

$$T_i(n\tau)=X_i(n\tau)+W_i(n\tau), \quad (1)$$

A noiseless (i.e., clean, flat, smooth, etc.) state component $X_i$(t) and the noise component $W_i$(t).

Embodiments of the invention may include separating (e.g., de-noising) the signal to extract a smooth portion of the signal, in operation 310. The smooth (state) portion and a noise portion of the signal may be separated using one or more de-noising methods. Such methods may include but are not limited to running average, exponential running average, filtering or any other methods known to those skilled in the art of signal processing or the art of statistics.

The smooth portion may be analyzed for detection of the different sates of the system, in operation 320. Various methods can be used to descript system states, for example, using histogram, feature lists, unbiased estimation (Maximum likelihood, least squares, Bayesian estimators and deep neural networks), Density Estimation and Kernel estimation, V-optimal histograms be saved and the like. As used herein, a system state may include one or more set points of the system (e.g., predetermined working conditions, such as, power, temperature, pressure and the like), operation modes of the system (e.g., working or not-working during a time period) and/or measured values (e.g., of the smooth portion) of the monitored system parameter(s) (e.g., the temperature, pressure, vibration etc.) that are constant over a period of time (e.g., seconds, minutes, hours, days, etc.) or vary within predetermined margins (e.g., margins below a predetermined threshold value). Once the set of states has been detected the smooth portion of the signal $X_i$ may be divided into discrete segments. The segments may be either overlapping or consecutive, and the specific state of the system may be identified. The states of all segments for the $i^{th}$ signal may be collected into a vector $si^N$ where N is the number of segments.

The noise portion of the signal $W_i(t)$ may be obtained by subtracting the de-noised smooth portion $-D_i(t)$ from the original (total) signal $T_i(t)$, in operation 330. In some embodiments, $D_i(t)$ may be an approximation of $X_i(t)$, (having tradeoffs between quality and speed of computation). Once $W_i(t)$ is obtained it may be analyzed to obtain noise signal features. In some embodiments, the signal may be divided into discrete segments (same segments used to construct the de-noised signal $D_i(t)$). A variety of methods may be used for obtaining features, for example, Statically modeling of the noise using methods (e.g., statistical moments, L-moments and the like), Autocorrelation, ARMA, Spectral analysis of the noise using methods (e.g., calculating the energy value at different frequency bands using different types of transforms such as classical Fourier transform, Wavelets or wavelets packets transform and the like), Hilbert-Huang transform and Empirical mode decomposition (EMD), the Continuous time Short Time Fourier Transform (Continuous time STFT), the two-sided Laplace transform, the Melin transform, the S-Transform, the Wigner-Ville Distribution, Composite spectrum (CS), Stationary wavelet transform (SWT) a wavelet transform algorithm designed to overcome the lack of translation-invariance of the DWT and the like. Other methods may include, State space features, fractal features and entropy feature such as—minimum embedding dimension, Lyapunov exponents, box dimension, fractal dimension, entropy and others.

In some embodiments, once the set of features have been computed for each segment in the noise portion of the signal may be collected to a matrix $FP_i^N$-where N is the window number. The noise features for the segment collected into a vector may then be used for classifying the noise portion, in operation 340. The noise portion (e.g., set in a vector) may be used as an input to corresponding classification model $CM_i$, received from a fingerprint database (e.g. database 115), in operation 350. In some embodiments, at least some discrete segment of the noise portion may be separately classified. The output of classification model may be an expected state of the system values (e.g., a smooth signal). The expected state obtained from the calcification model may then be compared to the determined state of the system, at operation 360. The expected values XC, obtained from the classification model may be compared to the system state values $X_i$, for example, by mean of subtraction. If there is a good fit between the expected state values and the actual state values, the system continues to sample the next segment. If there is a discrepancy (or incase the features do not correspond to any of the model classes)-meaning the signal state fingerprint is not compatible with the system actual state an indication (e.g., an alert) of a fake signal may be generated and transmitted to the required users, accordingly, an attack on the monitored physical system may be detected based on the comparison, in operation 365. For example, if the subtraction is higher than a pre-defined threshold the signal is declared fake=>$(XC_i-X_i)$>threshold then signal may be fake and an alarm may be sent.

Figure 4:
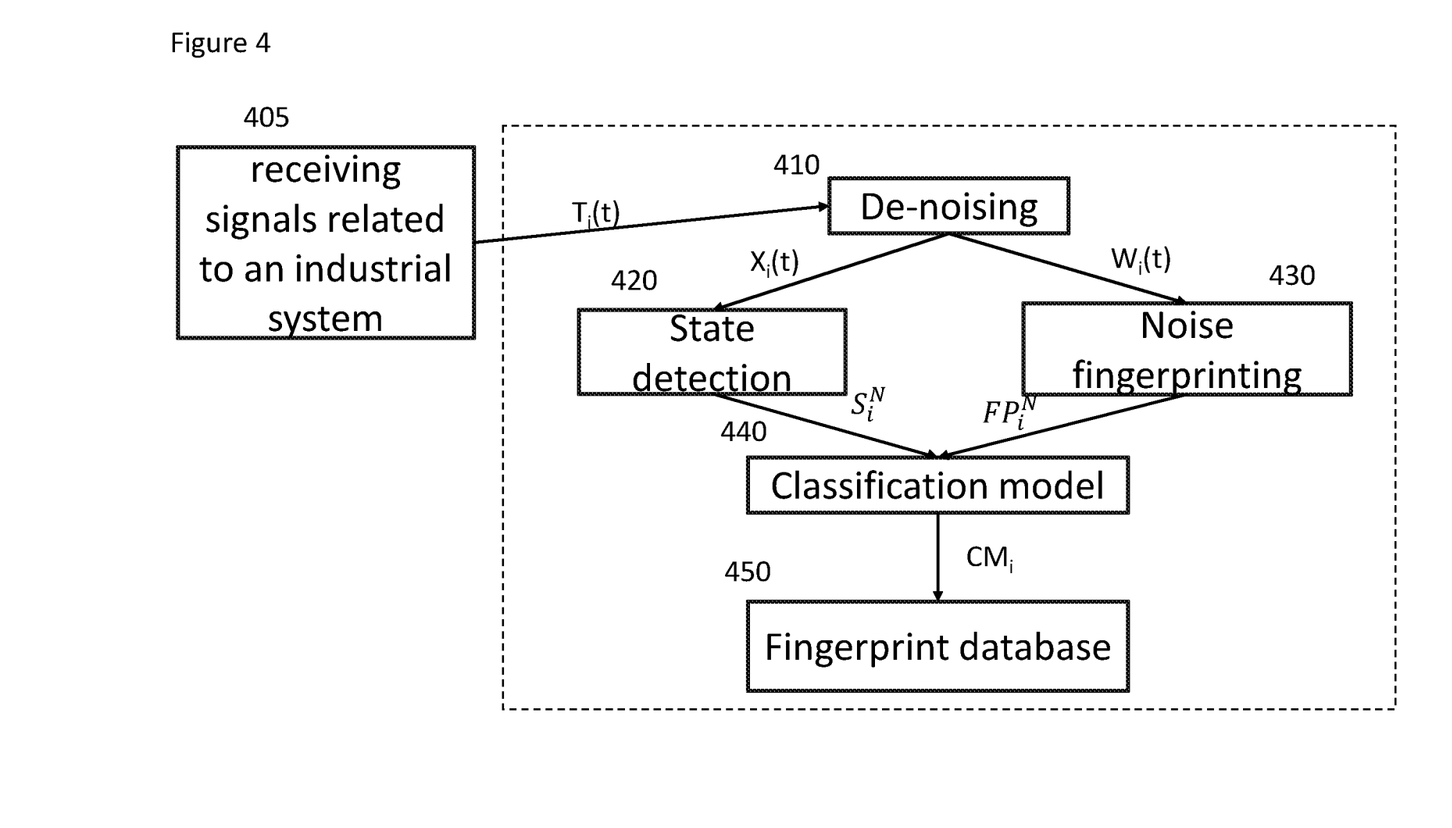
FIG. 4 is a flowchart of a method of building a fingerprints database for a monitored physical system according to embodiments of the present invention.

Reference is made to FIG. 4 which is a flowchart of a method of building a fingerprints database for a monitored physical system according to embodiments of the present invention. The method of FIG. 4 may be performed by any controlling or computing system for example, system 200. Operations 405, 410, 420 and 430 may be substantially the same as operations 305, 310, 320 and 330 of the method of FIG. 3. In some embodiments, signal $X_i(t)$ associated with a known state of the system, may be received, in operation 405, from a specific monitored physical system (e.g., a power plant) when the monitored physical system works under "normal" or "expected" conditions, meaning that the system is not under any attack and all operation parameters and/or detected signals are as expected. In some embodiments, both features matrix $FP_i^N$ (of the noise signal) and state vector $s_i^N$ (of the smooth signal) may be used as a training and validation set for a classification algorithm. The received signal may be de-noised to extract a smooth portion of the signal and obtaining the noise portion of the signal, for example, according to operations 310 and 340 of FIG. 3. In some embodiments, the smooth portion of the signal and the noise portion of the signal with the known state of the system may be associated with the known state of the system. There are a variety of classification algorithms that may be used at this stage such as, support vector classification (SVCs), random forest and the like. In operation 440, the classification algorithm (or algorithms) may be used to generate a classification model $CM_i$. The classification model for the signal indexed by i is then stored in a database (e.g., database 115), in operation 450. The signal indexed stored in database 115 may be related to a specific monitored physical system working at ordinary or expected conditions.

Figure 5:
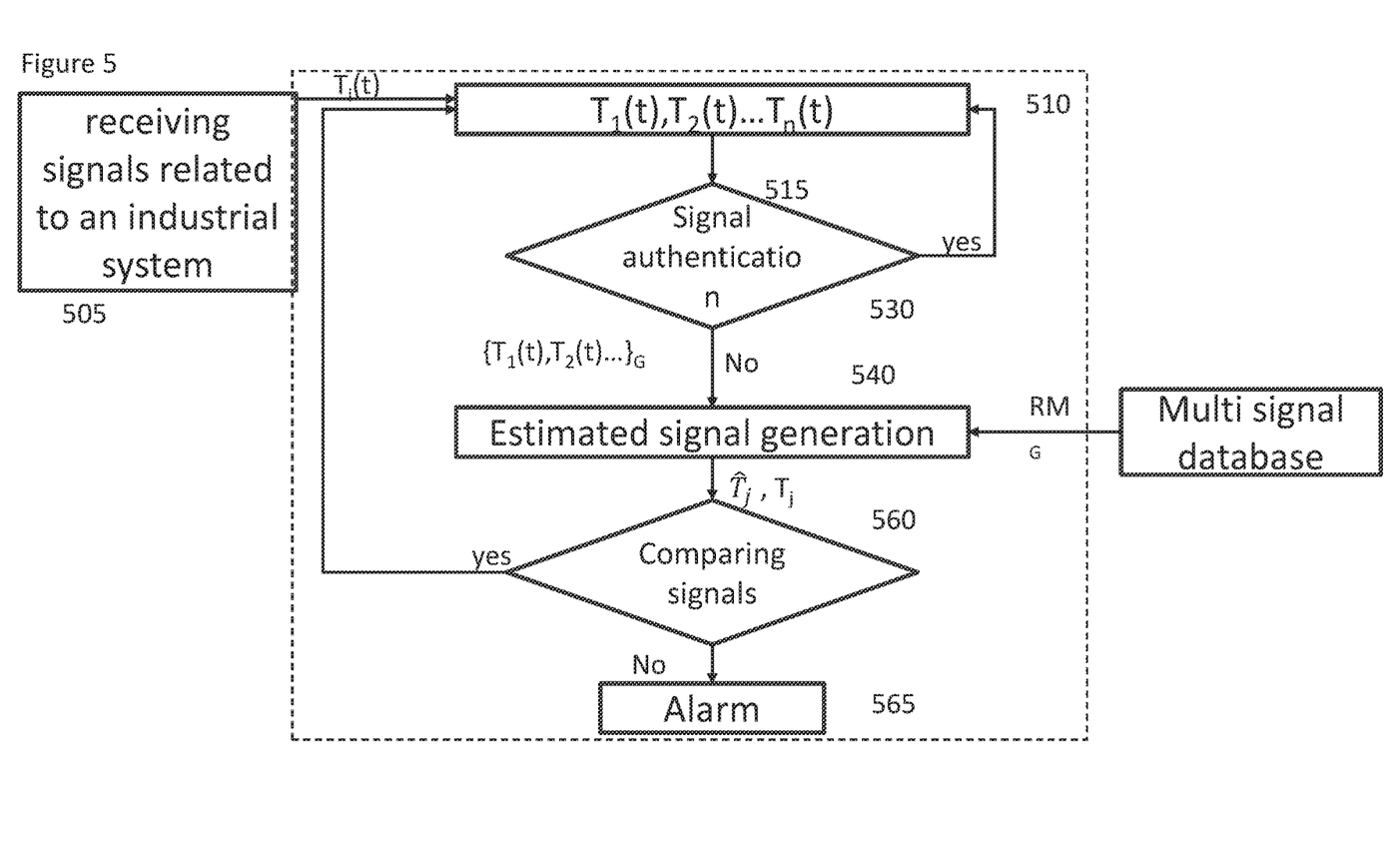
FIG. 5 is a flowchart of a method of detecting attacks on monitored physical systems according to embodiments of the present invention.

Reference is made to FIG. 5 which is a flowchart of a method of detecting attacks on monitored physical systems according to some embodiments of the present invention. The method of FIG. 5 may be performed by system 200 or by any other system. The method of FIG. 5 may be applied to signals defined as potential fake signals by the method of FIG. 3. A set of signals $T_i(t)$ related to a monitored physical system may be received, in operation 505, for example, from SCADA 110 and/or history server 122. In some embodiments, at least two of signals $T_i(t)$ may be related to two different parameters of the monitored system. For example, if the monitored system is a steam turbine in a power plant, T1(1) may be the temperature of the steam in the entrance to the turbine, T2($t$) the pressure of the steam at the exit of the turbine, T3($t$) the torque in the main axis of the turbine and T4($t$) the produced electrical power.

In some embodiments, the set of signals may be continuously monitored looking for fake signals by analyzing segments (the same size and overlap as used in the training stage). Time segments of all signals $T_1 \ldots T_n$ may be taken, in operation 510. Operation 510 may include at least some of operations 310-360 of FIG. 3 conducted on a plurality of signals.

In some embodiments, at least some of the signals in the set may be authenticated in operation 515, using for example, the method disclosed in operation 365. For example, form the set of signals $T_1 \ldots T_n$ being analyzed some of the signals may be identified as non-fake or authenticated signals while at least one of the signals $T_j$ may be identified as being a fake signal or un-authenticated signal.

In operation 530, embodiments may include applying a corresponding regression model on the identified at least one un-authenticated signal $T_j$ in the set. In some embodiments, the authenticated (non-fake) may be used to further estimate the non-authenticated (e.g., fake) signal(s). The regression model may receive multi-signal regressions save in a database (e.g., database 115). For example, a set of 10 Ti signals (i=1:10) may undergo the noise fingerprint authentication of FIG. 3 to found 9 non-fake authenticated signals and one Tj signal may be a fake signal. An estimated signal $\hat{T}_j$ may be generated, in operation 540, based on the authenticated signals (e.g., the 9 authenticated signals) from the same set. For example, a regression model (as known on the art) may be applied to estimate the values of the fake signal (unauthenticated) based on the other 9 signals (which are authenticated), such that—$\hat{T}_j = wT_{2:9}$ (where T are the signals and w a vector representing the regression model).

In some embodiments, two signals $T_j$ and $\hat{T}_j$ may be compared, in operation 560. For example, $\hat{T}_j$ (the estimated value) may be compared to $T_1$ the measured value (e.g., T1 can be either a fake signal or real signal) and if there is discrepancy alert. The comparison may be done, for example, by mean of subtraction. In some embodiments, if the absolute subtraction value is above a predetermined threshold the signal may unauthenticated. If the two match up to some predefined level, the system may continue its monitoring and training of the signal fingerprints. If the two do not match an indication of a fake signal may be generated and transmitted to the required users and an attack on the monitored physical system may be detected based on the comparison, in operation 565.

In some embodiments, the method of FIG. 5 may further include further evaluation of at least one potentially fake signal identified based on the compression between the first estimated signal and the at least one un-authenticated signal in operation 560. In some embodiments, the method my further include receiving one or more external signals from one or more sensors external to the monitored system. For example, if the monitored system is a turbine in a factory, a microphone and/or IR camera may be placed outside a factory to measure sound and/or heat coming from the turbine. In some embodiments, the method may further include generating a second estimated signal for each of the at least one potentially fake signal based on the one or more external signals.

In some embodiments, a regression model may be used to validate the some of the monitored system signals based on the external signals. For example, a turbine output energy may be estimated based on heat and pitch (from the measured external sound) according to the following: $[T=w1*Tex+w2*Pitch]$, where w1 and w2 are linear regression coefficients. In some embodiments, the method may include comparing the second estimated signal and the at least one potentially fake signal and detecting an attack on the monitored physical system based on the comparison.

Figure 6:
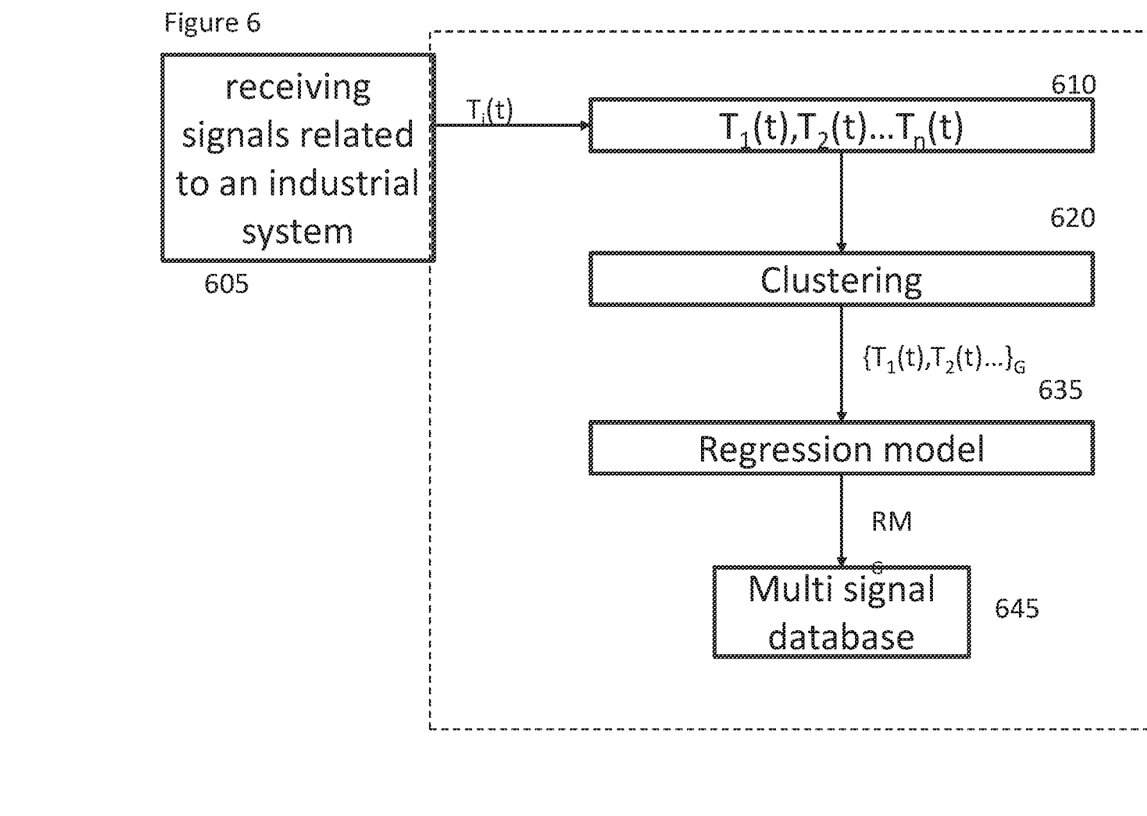
FIG. 6 is a flowchart of a method of building a fingerprints database for a monitored physical system according to embodiments of the present invention.

Reference is now made to FIG. 6 which is a flowchart of a method of building a fingerprints database for a monitored physical system according to embodiments of the present invention. The method of FIG. 6 may be performed by any controlling or computing system for example, system 200. A set of signals $T_i(t)$ associated with a known state of the system may be received, in operation 605, for example, from SCADA 110 and/or history server 122. The received set of signals may be also received from the monitored physical system when the system operates at "normal" operation, when the system is not under attack, and all the measured signals are expected signals. In some embodiments, the received signal may be collected when the system is under attack, and may be identified as "fake signals" for later use.

In some embodiments, the set of signals may be continuously monitored by analyzing segments (the same size and overlap as used in the training stage). Time segments of all signals $T_1 \ldots T_n$ may be taken, in operation 610.

In the first stage a clustering algorithm may be used to identifying a sub-set of correlated signals $G_i$, in operation 620. In some embodiments, the correlation may be done in order to verify that signal received from the same physical system, for example, using either linear or non-linear methods. A variety of clustering algorithms may be used at this stage, for example, hierarchical clustering, K-means, spectral clustering, Gaussian mixtures and the like.

Training of the regression model can also be performed every predefined time constant (such as every week or every month) or the training can be done continuously as each authenticated segment is then used to re-train the set of regression models.

The signals of each set $G_i$ may be used to build a regression model $RM_G$, in operation 635. The regression model may be stored in a multi signal model database in operation 645, to later be used in operations 530 and 540 of the method of FIG. 5. A variety of methods may be used to generate the regression model, for example, linear regression, Bayesian regression, support vector regression and the like. It should be noted that in building the regression model every possible combination of signals may be used so that each signal can be estimated even if only one of the other signals is authenticated.

In some embodiments, training or updating the regression model may also be performed every predefined time constant (such as every week or every month) or the training can be done continuously as each authenticated segment is then used to re-train the set of regression models.

In some embodiments, once any form of model update (or combination of them) has been used, it will usually be needed to eliminate some of the former members of the training set: one may then for instance use a simple rule of replacement such as FIRST IN-FIRST OUT, LAST IN-FIRST OUT.

Using such a method, specific cases of maintenance or device replacements can be identified as such and not cause any false alarm as the device fingerprint might change but not its actual correlation with other devices. So while the first authentication stage might indicate that the signal is fake the second stage will show that the signal is good.

In some embodiments, the methods and system disclosed above may be directed to recognize false signals and in particular attacks on an electricity production plant. Embodiments of the method may include comparing noise segment of a signal received from one or more devices included in the electricity production plant to noise segments stored in a database. The comparison may include at least one of: testing models for fake time signals, using one or more multi-class classification methods for identifying if a signal segment is more likely genuine or has more likely been built according to one or more methods to generate fake signals and using one or more one-class classifiers, built using one or more approach such as Support Vector Machines, density methods, extreme value theory. In some embodiments the comparison may include, one or more one-class classifiers, built using one or more approach such as Support Vector Machines, density methods, extreme value theory.

In some embodiments, the method may include receiving a plurality of signals, filtering the signals to receive smooth signals and comparing total smooth signals to each other.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A computer method for detecting attacks on physical systems, the method comprising:
    receiving at least one signal related to a monitored physical system;
    de-noising the at least one signal to extract a smooth portion of the signal;
    detecting one or more states of the monitored physical system by analyzing the smooth portion of the signal;
    obtaining a noise portion of the signal by subtracting the de-noised smooth portion from the at least one signal;
    classifying the noise portion;
    determining one or more expected states of the system based on the classified noise portion;
    comparing the one or more expected states to the detected one or more states; and detecting an attack on the monitored physical system based on the comparison.

2. The computer method of claim 1, wherein classifying the noise portion comprises:
comparing the noise portion to classified fingerprints of noise portions stored in a database.

3. The computer method according to claim 1, further comprising:
dividing the noise portion into discrete segments,
and wherein classifying the noise portion comprises classifying at least some of the discrete segments.

4. The computer method of claim 1, further comprising dividing the noise portion into discrete segments, wherein classifying the noise portion comprises classifying at least some of the discrete segments, and wherein classifying the noise portion further comprises obtaining noise signal features from the discrete segments.

5. The method according to claim 1, wherein the at least one signal related to the monitored physical system comprises at least one of: temperature, current, voltage, pressure, vibrations, strains, power, phase, and loads.

6. The method according to claim 1, further comprising:
receiving a signal associated with a known state of the monitored system;
de-noising the received signal to extract a smooth portion of the signal and obtaining the noise portion of the signal;
associating each one of the smooth portion of the signal and the noise portion of the signal with the known state of the system; and
saving the noise portion of the signal associated the known state of the monitored system in a database.

7. The computer method of claim 1, further comprising:
receiving a signal associated with a known state of the monitored system;
de-noising the received signal to extract a smooth portion of the signal and obtaining the noise portion of the signal;
associating each one of the smooth portion of the signal and the noise portion of the signal with the known state of the system;
saving the noise portion of the signal associated the known state of the monitored system in a database; and
saving the smooth portion of the signal associated the known state of the monitored system in the database.

8. The computer method of claim 1, further comprising:
receiving a signal associated with a known state of the system;
de-noising the received signal to extract a smooth portion of the signal and obtaining the noise portion of the signal;
associating each one of the smooth portion of the signal and the noise portion of the signal with the known state of the system;
saving the noise portion of the signal associated the known state of the system in the database; and
generating a classification module based on the associated smooth and noise portions.

9. The computer method of claim 1, further comprising:
receiving a signal associated with a known state of the system;
de-noising the received signal to extract a smooth portion of the signal and obtaining the noise portion of the signal;
associating each one of the smooth portion of the signal and the noise portion of the signal with the known state of the system;
saving the noise portion of the signal associated the known state of the system in the database;
generating a classification module based on the associated smooth and noise portions; and
updating the classification module with new associated smooth and noise portions.

10. The computer method according to claim 1, further comprising:
receiving a set of signals related to the monitored physical system;
identifying some of the signals in the set as authenticated signals;
identifying at least one of the signals in the set to be un-authenticated signal;
generating a first estimated signal for at least one of the un-authenticated signal based on the identified authenticated signals;
comparing the first estimated signal and the at least one un-authenticated signal; and
detecting an attack on the monitored physical system based on the comparison.

11. The method of claim 1, further comprising:
receiving a set of signals related to a monitored physical system;
identifying some of the signals in the set as authenticated signals;
identifying at least one of the signals in the set to be un-authenticated signal;
generating a first estimated signal for a of the at least one of the un-authenticated signal based on the identified authenticated signals;
comparing the first estimated signal and the at least one un-authenticated signal; and
detecting an attack on the monitored physical system based on the comparison, wherein the set of signals include two or more signals related to two or more different parameters of the monitored physical system.

12. The method of claim 1, further comprising:
receiving a set of signals related to a monitored physical system;
identifying some of the signals in the set as authenticated signals;
identifying at least one of the signals in the set to be un-authenticated signal;
generating a first estimated signal for a of the at least one of the un-authenticated signal based on the identified authenticated signals;
comparing the first estimated signal and the at least one un-authenticated signal; and
detecting an attack on the monitored physical system based on the comparison, wherein generating an estimated signal comprises generating a specific vector based on a regression model for each of the at least one of the un-authenticated signal based on the identified authenticated signals.

13. The method of claim 10, further comprises:
identifying at least one signal from the set of signals as a potentially fake signal based on the compression between the first estimated signal and the at least one un-authenticated signal
receiving one or more external signals from one or more sensors external to the monitored system;
generating a second estimated signal for each of the at least one potentially fake signal based on the one or more external signals;
comparing the second estimated signal and the at least one potentially fake signal; and detecting an attack on the monitored physical system based on the comparison.

14. A system for detecting attacks on physical systems, the system comprising:
a processor configured to:
receive at least one signal related to a monitored physical system;
de-noise the at least one signal to extract a smooth portion of the signal;
detect one or more states of the monitored physical system by analyzing the smooth signal;
obtain a noise portion of the signal by subtracting the de-noised smooth portion from the at least one signal;
classify the noise portion;
determine expected states of the system based on the classified noise portion;
compare the expected states to the detected one or more states; and
detect an attack on the monitored physical system based on the comparison.

15. The system of claim 14, further comprising:
a database,
and wherein the processor is further configured to:
compare the noise portion to classified fingerprints of noise portions stored in the database.

* * * * *